(12) United States Patent
Merhar et al.

(10) Patent No.: US 8,651,786 B2
(45) Date of Patent: Feb. 18, 2014

(54) FASTENING DEVICE FOR MOUNTING ON A MOUNTING RAIL

(75) Inventors: Thomas Merhar, Schaan (LI); Peter Mugg, Nueziders (AT)

(73) Assignee: Hilti Aktiengesellschaft, Schaan (LI)

( * ) Notice: Subject to any disclaimer, the term of this patent is extended or adjusted under 35 U.S.C. 154(b) by 423 days.

(21) Appl. No.: 12/658,451

(22) Filed: Feb. 9, 2010

(65) Prior Publication Data

US 2010/0202853 A1 Aug. 12, 2010

(30) Foreign Application Priority Data

Feb. 11, 2009 (DE) .................... 10 2009 000 786 U

(51) Int. Cl.
*F16B 27/00* (2006.01)
(52) U.S. Cl.
USPC ............................................. 411/84; 411/552
(58) Field of Classification Search
USPC ..................... 411/551, 552, 84; 248/223.1
See application file for complete search history.

(56) References Cited

U.S. PATENT DOCUMENTS

| 5,593,265 A | 1/1997 | Kizer ............................ 411/552 |
| 5,893,538 A * | 4/1999 | Onishi et al. ..................... 248/65 |
| 6,588,711 B2 * | 7/2003 | Onishi ............................ 248/49 |

FOREIGN PATENT DOCUMENTS

| DE | 87 15 256 | 3/1988 |
| DE | 87 15 256 U1 | 3/1988 |
| DE | 196 17 750 | 10/1997 |
| DE | 202 02 681 U1 | 5/2002 |
| DE | 101 46 492 | 4/2003 |
| DE | 20 2004 017022 | 3/2006 |
| EP | 0 553 765 B1 | 8/1993 |
| EP | 05 53 765 | 8/1993 |
| EP | 0805297 | 3/1998 |

\* cited by examiner

*Primary Examiner* — Gary Estremsky
(74) *Attorney, Agent, or Firm* — Davidson, Davidson & Kappel, LLC

(57) ABSTRACT

A fastening device (21) for mounting on a mounting rail (11) having a rear-engagement member (22) which is configured to be introduced into the mounting opening (15) and to engage behind the rims (14) of the mounting opening (15) of the mounting rail (11); including a tensioning device (32) which cooperates with the rear-engagement member (22) and has a longitudinal axis, for clamping the fastening device (21) to the mounting rail (11); including a contact plate (42) for resting on the outside of the mounting rail (11) that has a feed-through opening for a part of the tensioning device (32); and a spring element (52) configured between the contact plate (42) and the rear-engagement member (22) for preloading the rear-engagement member (22) circumferentially with respect to the longitudinal axis (34) of the tensioning device (32); including a holding device (62) between the rear-engagement member (22) and the contact plate (42) for holding the rear-engagement member (22) in the preloaded position; upon release of the holding device (62), the rear-engagement member (22) being movable by the spring element (52) from the insertion position to a rear-engagement position where it engages behind the rims (14) of the mounting opening (15). One stop element (47) having a stop face for limiting the capacity of the rear-engagement member (22) for twisting rotation is provided on the contact plate (42).

20 Claims, 4 Drawing Sheets

FASTENING DEVICE FOR MOUNTING ON A MOUNTING RAIL

This claims the benefit of German Patent Application DE 10 2009 000 786.5, filed Feb. 11, 2009 and hereby incorporated by reference herein.

The present invention relates to a fastening device for mounting on a mounting rail.

BACKGROUND

In the field of building services engineering, rail systems are used for securing conduits, for example, for water, heat, ventilation, air conditioning, and/or electrical installations, thereto, simply through the use of suitable fastening devices, such as pipe clamps and channel nuts. Also provided on rail systems are devices which are designed for hanging components and whose rod members can likewise be secured to the rail systems through the use of suitable fastening devices. Fastening devices having angle elements as contact plates, for example, are likewise used for connecting a plurality of rail elements.

For a rail system of this kind, what is generally referred to as a C-shaped mounting rail is often used, as is known, for example, from the German Utility Model Patent DE 87 15 256 U1. The interior space enclosed by the mounting rail is externally accessible via a mounting opening extending along the longitudinal extension of the mounting rail that is laterally delimited by rims. The mounting opening has a clearance width extending transversely to the longitudinal extension of the mounting rail that is smaller than the corresponding inside dimensions of the interior space of the mounting rail.

From the European Examined Patent Application EP 0 553 765 B1, a fastening device is known for clamping a conduit to a C-shaped mounting rail. The fastening device has a rear-engagement member which is configured to be introduced into the mounting opening and to engage behind the rims of the mounting opening of the mounting rail which has an internally threaded portion. The width of the rear-engagement member is smaller than the clearance width of the mounting opening, and its length is greater than the clearance width of the mounting opening. In addition, to clamp the fastening device to the mounting rail, the fastening device has a tensioning device in the form of a tensioning bolt which cooperates with the rear-engagement member and has a longitudinal axis, the tensioning bolt being connected by its inwardly threaded portion to the rear-engagement member. In addition, a contact plate having a feed-through opening for the shank of the tensioning bolt as part of the tensioning device, is provided for resting on the outside of the mounting rail. Configured between the contact plate and the rear-engagement member is a spring element for preloading the rear-engagement member circumferentially with respect to the longitudinal axis of the tensioning device. By way of a holding device between the rear-engagement member and the contact plate, the rear-engagement member is held in the preloaded position which corresponds to the insertion position of the rear-engagement member upon its introduction into the mounting opening of the mounting rail. The holding device encompasses recesses on the rear-engagement member that cooperate with projections on the contact plate. Upon introduction of the rear-engagement member into the mounting opening of the mounting rail, the holding device is released in the direction of the contact plate in response to axial displacement of the tensioning bolt; in response to the preloading exerted by the spring element, the rear-engagement member being moved from the insertion position to a rear-engagement position where it engages behind the rims of the mounting opening. The twisting rotation of the rear-engagement member is limited by stop faces provided thereon that come to rest against the mutually facing inner sides of the rims of the mounting opening.

SUMMARY OF THE INVENTION

The drawback of the known approach is that it requires that this fastening device be adapted to a special geometry of the mounting rail, in particular, to the geometry of the mounting opening, since, otherwise, the rear-engagement member can be subject to overtwisting, or, upon release of the holding device, not be in an ideal orientation for engaging behind the rims of the mounting opening to optimally clamp the fastening device to the mounting rail.

An object of the present invention is to provide a fastening device that will be more flexible with respect to the mounting rail geometry and that will ensure a precise orientation of the rear-engagement member for introducing force into the mounting rail in the tensioned state.

The present invention provides a fastening device for mounting on a mounting rail having a rear-engagement member which is configured to be introduced into the mounting opening and to engage behind the rims of the mounting opening of the mounting rail, comprising a tensioning device which cooperates with the rear-engagement member and has a longitudinal axis, for clamping the fastening device to the mounting rail; comprising a contact plate for resting on the outside of the mounting rail that has a feed-through opening for at least a part of the tensioning device; comprising a spring element configured between the contact plate and the rear-engagement member for preloading the rear-engagement member circumferentially with respect to the longitudinal axis of the tensioning device; and comprising a holding device between the rear-engagement member and the contact plate for holding the rear-engagement member in the preloaded position; upon release of the holding device, the rear-engagement member being movable by the spring element from the insertion position to a rear-engagement position where it engages behind the rims of the mounting opening.

In accordance with the present invention, at least one stop element having a stop face for limiting the capacity of the rear-engagement member for twisting rotation is provided on the contact plate.

Since the maximum capacity of the rear-engagement member for twisting rotation is defined by the at least one stop element, the fastening device according to the present invention advantageously is substantially independent of manufacturing tolerances of the mounting rail. In this context, the precise orientation of the rear-engagement member can be ensured at all times following release of the holding device. Two mutually diametrically opposing stop elements for the rear-engagement member, which engage on two mutually diametrically opposing sections of the rear-engagement member in the rear-engagement position thereof, are advantageously provided on a contact plate and advantageously ensure the correct orientation of the rear-engagement member for engaging behind the rims of the mounting rail.

The spring element is advantageously a coil spring whose ends are fastened on one side to the contact plate and, on the other side, to the rear-engagement member. The spring element is advantageously a torsion-tension spring which preloads the rear-engagement member not only in a direction of rotation about the longitudinal axis of the tensioning device, but also in the direction of the contact plate. Thus, upon release of the holding device, the fastening device is premounted so as to be restrained, but still displaceable on the mounting rail.

The at least one stop element preferably projects from the contact side of the contact plate facing the rear-engagement member, thereby facilitating an especially simple constructional design of the fastening device. The entire width of the at least one stop element advantageously corresponds maximally to the clearance width of the mounting opening, so that, when the fastening device is placed between the rims of the mounting opening, the at least one stop element is able to penetrate into the interior space of the mounting rail to allow the contact plate to rest flat on the outside of the mounting rail.

The holding device for the rear-engagement member is preferably provided on the stop element, thereby allowing the stop element to be used at the same time to space apart the rear-engagement member and the contact plate in a defined manner, which simplifies a correct insertion of the rear-engagement member into the mounting opening and a subsequent rotation of the rear-engagement member underneath the free ends of the rims of the mounting opening. If the at least one stop element projects from the contact plate, then the holding device is advantageously provided on the free end of the at least one stop element. The holding device includes a holding pin, for example, which engages into a retaining recess for holding the rear-engagement member in the preloaded position.

A guide contour for the rear-engagement member is preferably provided between the holding device and a free end of the stop element, so that, upon release of the holding device, the rear-engagement member is displaceably guidable into the rear-engagement position to engage behind the rims of the mounting opening.

Preferably provided on a side of the rear-engagement member facing the contact plate is a first cylindrical sleeve section and, on the contact side of the contact plate facing the rear-engagement member, a second cylindrical sleeve section surrounding the feed-through opening, the first sleeve section and the second sleeve section being configured to be mutually telescopic, and the at least one stop element being provided on the sleeve section of the contact plate. The sleeve sections, which slide into one another, ensure an advantageous guidance of the rear-engagement member relative to the contact plate. The spring element for preloading the rear-engagement member is advantageously configured outside of these sleeve sections.

The stop element preferably includes at least one first latch means for orienting the rear-engagement member in its insertion position and at least one second latch means for orienting the rear-engagement member in its rear-engagement position, at least one counter-latch means being provided on the rear-engagement member for engaging into the latch means in correspondence with the orientation of the rear-engagement member. The latch means includes, for example, two mutually spaced apart notches or recesses which, on the one hand, define the insertion position of the rear-engagement member and, on the other hand, the rear-engagement position of the rear-engagement member. The counter-latch means advantageously includes tabs or projections which engage into the corresponding notch or recess in correspondence with the orientation of the rear-engagement member relative to the contact plate, respectively relative to the mounting opening.

If a sleeve section projects from the contact plate and from the rear-engagement member, respectively, then the latch means is advantageously formed from recesses which are configured on the free rim of the sleeve section of the contact plate, and the counter-latch means is formed from a tab which advantageously projects radially inwardly, in the case that the sleeve section of the rear-engagement member is configured to embrace the sleeve section of the contact plate, or projects radially outwardly when the sleeve section of the rear-engagement member is embraced by the sleeve section of the contact plate.

A second spring element is preferably provided between a section of the tensioning device, at the end thereof facing away from the rear-engagement member, and the contact plate, to spring-load a part of the tensioning device that is connected to the rear-engagement member, in the direction of the end facing away from the rear-engagement member, thereby providing an advantageous preloading of the rear-engagement member in the direction of the contact plate. The second spring element is advantageously designed as a coil spring which, for example, acts on a bolt head or a radially projecting expanded portion at the end of the tensioning device facing away from the rear-engagement member.

In one advantageous specific embodiment, the spring element between the rear-engagement member and the contact plate, as well as the second spring element between the end of the tensioning device facing away from the rear-engagement member, and the contact plate are designed as a one-piece spring device in the form of a pressure-torsion-spring. In this context, the section of the one-piece spring device configured underneath the contact plate and facing the rear-engagement member forms the torsional portion, and the section configured above the contact plate and facing away from the rear-engagement member forms the pressure portion of the one-piece spring device.

Preferably, the end of a part of the tensioning device connected to the rear-engagement member and facing the same is provided with a securing means for the rear-engagement member. The securing means is constituted, for example, of an upset portion or of a notch that widens the corresponding end of the part of the tensioning device. If the tensioning device encompasses a tensioning bolt, then the securing means is advantageously provided at the free end of the bolt shank. Alternatively to a securing means produced by deformation, a coating or elevation that, for example, enlarges the outside diameter may be provided at the end region of the corresponding end of the part of the tensioning device.

At its end facing away from the rear-engagement member, the tensioning device preferably has a mount for a rod element, thereby enabling the fastening device to be used directly as a connecting element for a clamp connection or for hanging a component on the mounting rail. Advantageously provided in the mount is a thread, for example, an internal thread, into which a rod element, such as a threaded rod, which is provided, at least in some regions, with a thread, for example, an external thread, is able to be screwed in and detachably secured in position. The mount is advantageously a through bore that extends over the entire longitudinal extension of the corresponding part of the tensioning device, thereby providing a large area for adjusting and positioning the rod element relative to the mounting rail.

At its end facing away from the rear-engagement member, the tensioning device preferably has a torque-receiving means for axially adjusting a rod element that is accommodated in the mount, the rod element anchored to the fastening device being displaceable relative to the mounting rail, without the fastening device mounted on the mounting rail having to be itself disengaged for this purpose. The torque-receiving means advantageously has an outer hexagonal contour for a commercial wrench for transmitting torque.

BRIEF DESCRIPTION OF THE DRAWINGS

The present invention is explained in greater detail below with reference to exemplary embodiments. In the drawing, the figures show.

DETAILED DESCRIPTION

Figure 1:
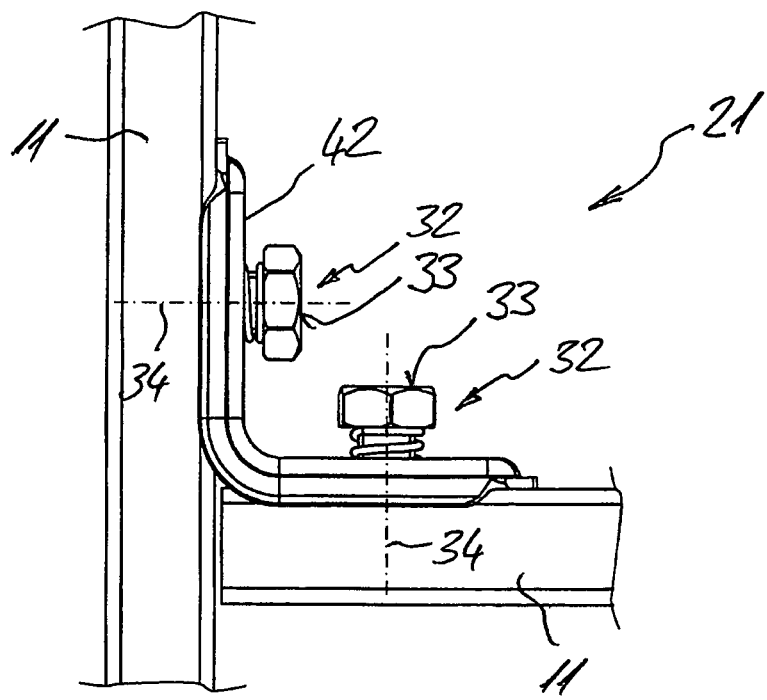
FIG. 1: a fastening device for connecting two mounting rails, in a lateral view.
Figure 2:
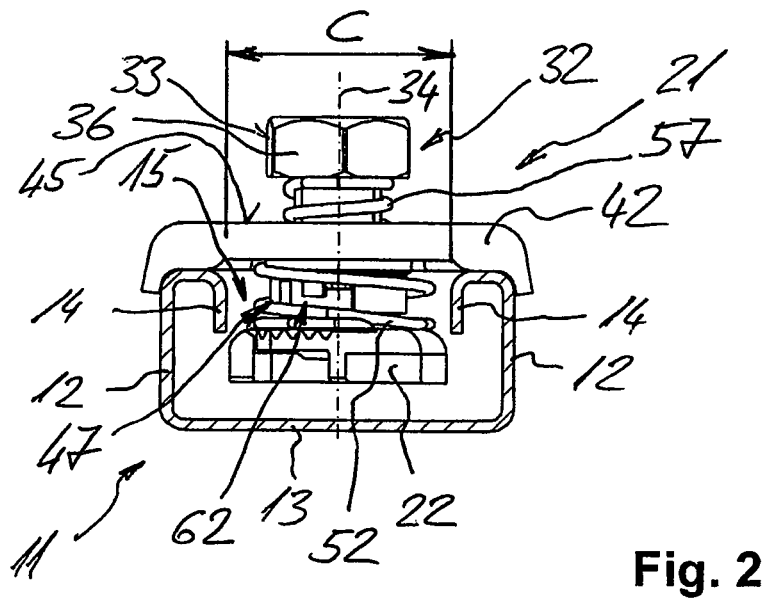
FIG. 2: a fastening device mounted on a mounting rail, in a view.
Figure 3:
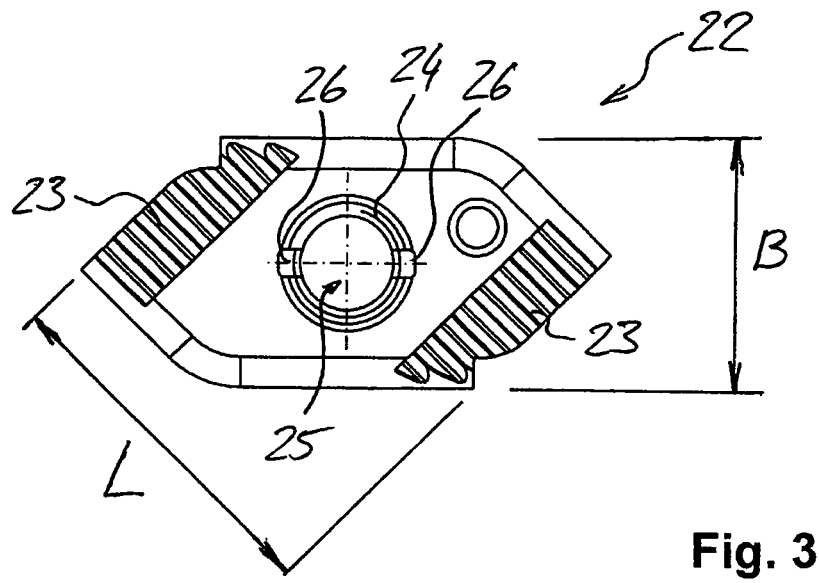
FIG. 3: a rear-engagement member of the fastening device shown in FIG. 2, in a plan view.
Figure 4:
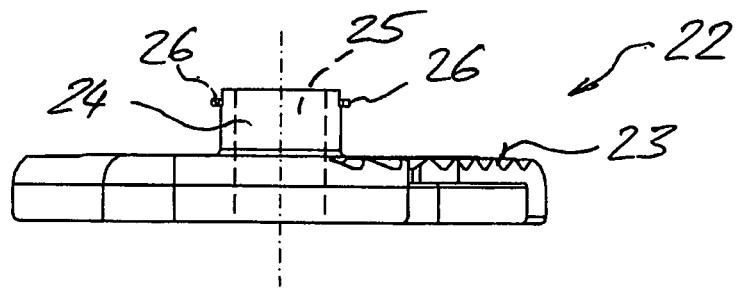
FIG. 4: the rear-engagement member in accordance with FIG. 3, in a lateral view.
Figure 5:
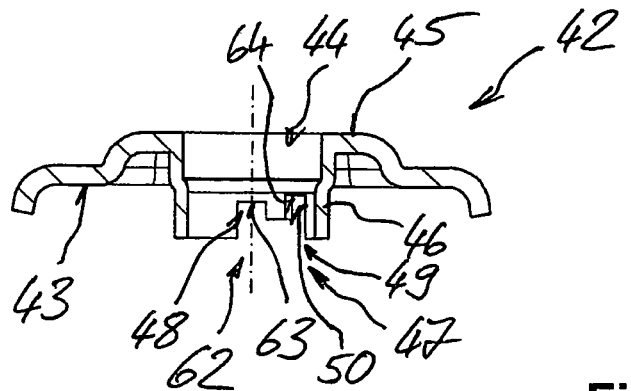
FIG. 5: a section through a contact plate of the fastening device shown in FIG. 2.
Figure 6:
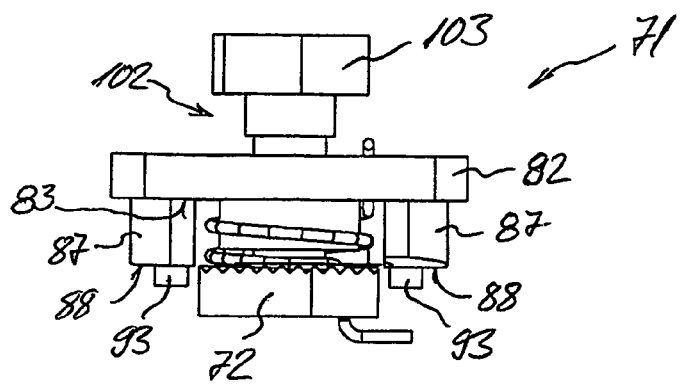
FIG. 6: a second exemplary embodiment of a fastening device in a lateral view.
Figure 7A:
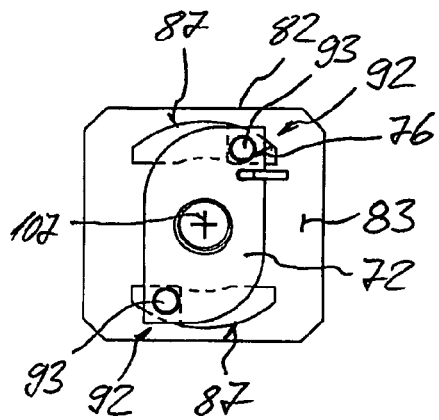
FIG. 7A a plan view of the rear-engagement member of the fastening device in accordance with FIG. 6, in the insertion position.
Figure 7B:
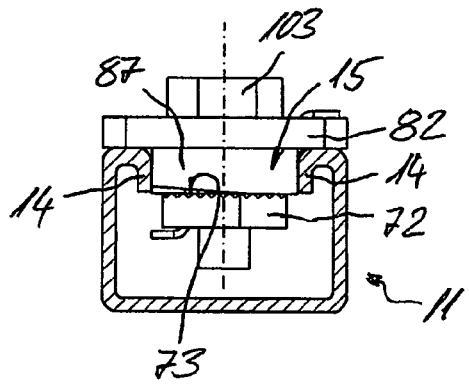
FIG. 7B a cross-sectional view of the fastening device in accordance with FIG. 6, with the rear-engagement member in the insertion position.

Fastening device 21 illustrated in FIG. 1 through 5 is used for connecting two C-shaped mounting rails 11.

Mounting rails 11 each have two mutually opposing side walls 12, a rear wall 13 joining these side walls 12, as well as a mounting opening 15 facing opposite this rear wall 13, bounded by rims 14, and extending along the longitudinal extension of mounting rail 11. Mounting opening 15 has a clearance width C extending transversely to the longitudinal extension of mounting rail 11 that is defined by the inwardly bent free ends of rims 14. Each mounting rail 11 encloses an interior space which is externally accessible through mounting opening 15.

Fastening device 21 has a rear-engagement member 22 having a width B that is smaller than clearance width C of mounting opening 15 in mounting rail 11, and a length L that is greater than clearance width C of mounting opening 15 in mounting rail 11. Clamping surfaces 23 of rear-engagement member 22 are toothed to facilitate an improved engagement with the free ends of rims 14 of mounting opening 15 that are likewise toothed. A first cylindrical sleeve section 24, which forms an internally threaded, through-going opening 25, projects by clamping surfaces 23 thereof from the side of rear-engagement member 22 to anchor a tensioning bolt 33 as tensioning device 32 to rear-engagement member 22. Tensioning bolt 33, which is connected to rear-engagement member 22, has a longitudinal axis 34 and is used for clamping fastening device 21 to mounting rail 11. Two mutually diametrically opposing tabs project radially outwardly as counter-latch means 26 from the free rim of sleeve section 24.

In addition, fastening device 21 encompasses an angle element as contact plate 42, which, when fastening device 21 is mounted on mounting rail 11, comes to rest by its contact side 43 against the outer side of mounting rail 11 adjacent to mounting opening 15 and thus acts upon the end face thereof. Contact plate 42 has a clamping surface 45 opposite contact side 43. In addition, contact plate 42 is provided with feed-through openings 44 for leading through shank 35 of tensioning bolt 33, shank 35 being configured to be freely rotatable in these feed-through openings 44. A second cylindrical sleeve section 46 surrounding feed-through opening 44 projects from contact side 43 of contact plate 42 facing rear-engagement member 22 in the assembled state of fastening device 21. In the assembled state of fastening device 21, first sleeve section 24 on rear-engagement member 22 and second sleeve section 46 of contact plate 42 extend telescopically into one another, so that rear-engagement member 22 is securely guided on contact plate 42.

Configured between contact plate 42 and rear-engagement member 22 is a torsion-tension coil spring as spring element 52, which preloads rear-engagement member 22 circumferentially with respect to longitudinal axis 34 of the tensioning bolt.

In addition, a holding device 62 is provided between rear-engagement member 22 and contact plate 42 for holding rear-engagement member 22 in a preloaded position that corresponds to the insertion position thereof On the one hand, holding device 62 is formed by a first notch 63 which is located at the free rim of second sleeve section 46 on contact plate 42 and, at the same time, constitutes a first latch means 48 of a stop element 47 for orienting rear-engagement member 22 in its insertion position, and, on the other hand, by the tabs as counter-latch means 26 on first sleeve section 24 of rear-engagement member 22. Stop element 47 projects from contact side 43 of contact plate 42 facing rear-engagement member 22. Here, stop face 50 is formed by the peripheral edge of second notch 64, which is configured at the free rim of second sleeve section 46 at a distance from first latch means 48 and is provided as a second latch means 49 for orienting rear-engagement member 22 in its rear-engagement position. The depth of second notch 64 is greater than that of first notch 63 of holding device 62, respectively of first latch means 48, in each case starting from the free rim of second sleeve section 46. Thus, holding device 62 for rear-engagement member 22 is provided on stop element 48. Diametrically opposite stop element 47, a second stop element 47 (not shown here) is provided on second sleeve section 46 of contact plate 42. As previously explained, the tabs projecting radially outwardly from the free rim of sleeve section 24 of rear-engagement member 22 form counter-latch means 26 for engaging into latch means 48, respectively 49, in correspondence with the orientation, respectively position, of rear-engagement member 22.

Provided between bolt head 36, as a section of tensioning device 32 at its end facing away from rear-engagement member 22, and contact plate 42, is a coil spring as a second spring element 57 for spring-loading tensioning bolt 33 and, thus, for spring-loading rear-engagement member 22 connected thereto.

Spring element 52 between rear-engagement member 22 and contact plate 42, as well as the aforementioned second spring element 57 are designed as a one-piece spring device in the form of a pressure-torsion spring, spring element 52 of the one-piece spring device configured underneath contact plate 42 and facing rear-engagement member 22 forming the torsional portion, and second spring element 57 configured above contact plate 42 and facing away from the rear-engagement member forming the pressure portion of the one-piece spring device.

When rear-engagement member 22 is introduced into mounting opening 15, it is held in an insertion position by holding device 62. Pressing on bolt head 36 in the direction of contact plate 42 releases the engagement of contact plate 42 with rear-engagement member 22, so that, in response to the preloading by spring element 52, rear-engagement member 22 is automatically rotated into its rear-engagement position for engaging behind rims 14 of mounting opening 15. An edge of notch 64, which forms second latch means 49, forms stop face 50 of stop element 47 and prevents rear-engagement member 22 from being overtwisted into a position relative to rims 14 of mounting opening 15 that does not permit or ensure an optimal clamping of fastening device 21 on mounting rail 11. In this preassembly position, fastening device 21 is restrained on mounting rail 11, but is still displaceable along mounting opening 15 for a repositioning or adjustment. To clamp fastening device 21 to mounting rail 11, tensioning bolt 33 is screwed into rear-engagement member 22, rear-engagement member 22 being displaced toward contact plate 42 and thereby making contact with the free ends of rims 14 of mounting opening 15. The depth of second notch 64 is selected in such a way that a large enough path is available for the axial offset of rear-engagement member 22 during the clamping process.

In the case of fastening device 71, as illustrated in FIG. 6 through 8B, two mutually diametrically opposing stop elements 87 project from contact side 83 of contact plate 82. At the free ends of these stop elements 87, a holding pin 93 is provided in each case as part of holding device 92 for holding rear-engagement member 72 in a preloaded position. In rear-engagement member 72, two mutually diametrically opposing retaining recesses 76 are provided which, together with holding pins 93, form holding device 92 (FIG. 7A, 7B). Between holding device 92 and a free end face 90 of stop element 87, a guide contour 89 is provided for rear-engagement member 72.

Figure 8A:
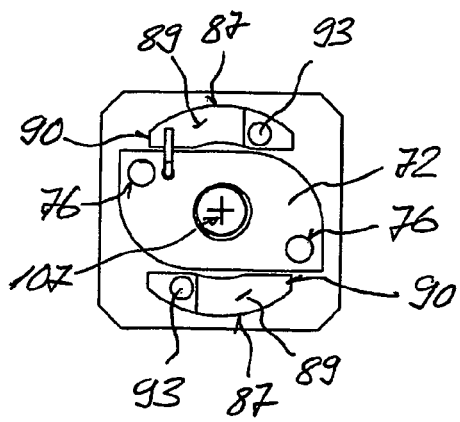
FIG. 8A a plan view of the rear-engagement member of the fastening device in accordance with FIG. 6, in the rear-engagement position.
Figure 8B:
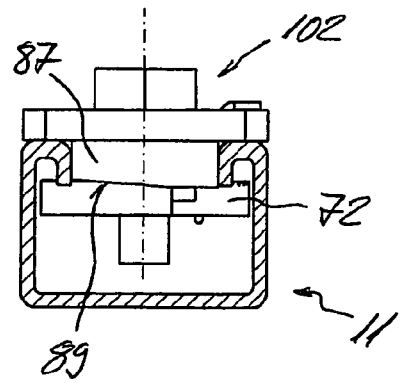
FIG. 8B a cross-sectional view of the fastening device in accordance with FIG. 6, with the rear-engagement member in the rear-engagement position.

Once rear-engagement member 72 is introduced into mounting opening 15, stop elements 87 extend into the interior space of mounting rail 11, and clamping surface 73 of rear-engagement member 72 comes to rest underneath the free ends of rims 14 of mounting opening 15. In response to displacement of tensioning bolt 103 toward contact plate 82, holding device 92 is disengaged, and rear-engagement member 72 is moved into a rear-engagement position where clamping surface 73 of rear-engagement member 72 comes to rest underneath the free ends of rims 14 of mounting opening 15 (FIG. 8A, 8B).

At the free end of tensioning bolt 103, a cross-shaped notch 107 is provided that widens this end region of tensioning bolt 103 in some areas and thus forms a securing means for rear-engagement member 72.

Figure 9:
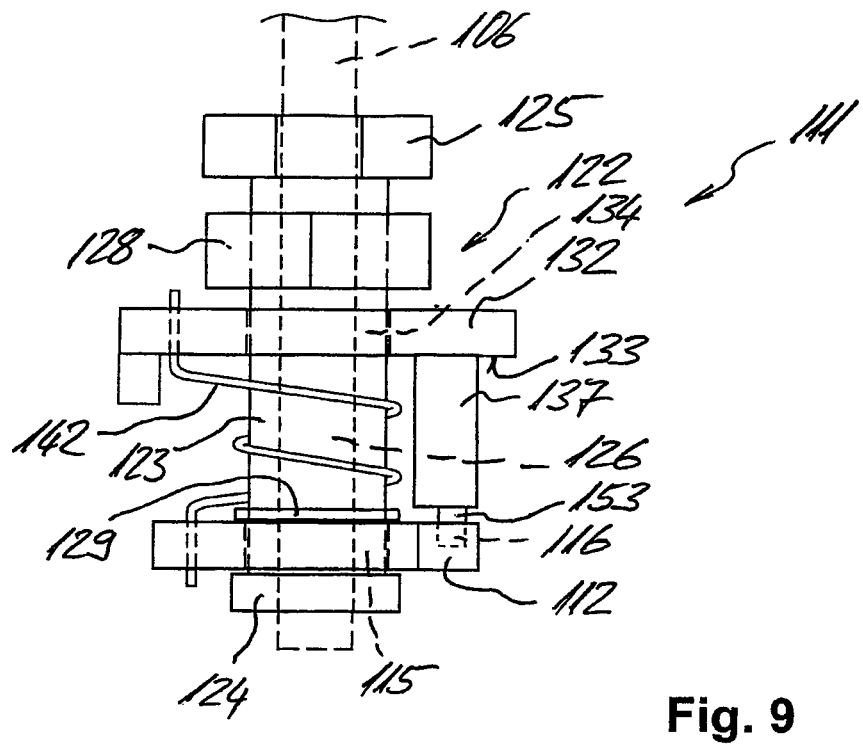
FIG. 9: a third exemplary embodiment of a fastening device in a lateral view.
Figure 10:
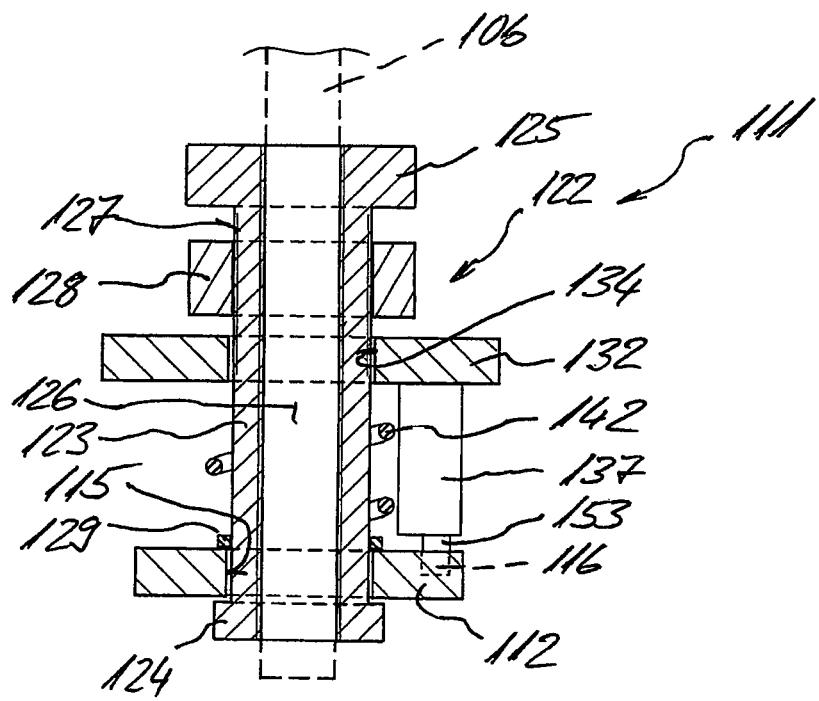
FIG. 10: the fastening device shown in FIG. 8 in a longitudinal section.

FIGS. 9 and 10 depict fastening device 111, which is provided for directly mounting a rod element 106, such as a threaded rod for a clamp connection, or for hanging an additional component on a mounting rail 11. In the case of fastening device 111, a pin-shaped stop element 137 projects from contact side 133 of contact plate 132. At the free end of stop element 137, a holding pin 153 is provided, which engages into a retaining recess 166 on rear-engagement member 112 to hold rear-engagement member 112 in a preloaded position.

Tensioning device 122 encompasses a sleeve-shaped adjusting element 123, which is rotationally mounted in opening 115 of rear-engagement member 112 and in feed-through opening 134 of contact plate 132. At the end facing rear-engagement member 112, adjusting element 123 has a radially outwardly projecting collar 124 for engaging behind rear-engagement member 112. Spaced apart from radially outwardly projecting collar 124 at the end of adjusting element 123 facing rear-engagement member 112 is an entrainment means 129, here in the form of a retaining ring, for rear-engagement member 112 at the outside thereof.

At the end facing rear-engagement member 112, adjusting element 123 has a radially outwardly projecting rotary entrainment collar 125, whose outer contour is provided with a hexagonal contour for forming a rotary entrainment means. Sleeve-shaped adjusting element 123 has a through-extending bore as a mount 126 for rod element 106. In this exemplary embodiment, mount 126 is provided over the entire longitudinal extent thereof, with an internal thread which accommodates an external thread of rod element 106. Provided on the outside, underneath rotary entrainment collar 125, in the direction of the end of adjusting element 123 facing rear-engagement member 112 is a region having an external thread 127 on which a tensioning nut 128 is configured.

By way of a pressure exerted directly on adjusting element 123 or indirectly via rod element 106 configured in mount 126 onto adjusting element 123, adjusting element 123 is displaced toward contact plate 132, rear-engagement member 112 being entrained by entrainment means 129, and holding device 152 formed by holding pin 153 and retaining recess 116 being released. Rear-engagement member 112 is subsequently moved from spring element 142 anchored to contact plate 132 and rear-engagement member 112 to its rear-engagement position, until rear-engagement member 122 comes to rest against an outer side of pin-shaped stop element 137 which, in the correct orientation of rear-engagement member 112, forms a stop face for the same. To clamp fastening device 111, tensioning nut 128 is brought into contact with contact plate 132 and rotated further to provide an adequate tensioning of fastening device 111.

Alternatively to a configuration of rod element 106 in mount 126, an additional element may be provided with an additional mount for rod element 106 on adjusting element 123. Additional element has an externally threaded tappet that is able to be screwed into mount 126 of adjusting element 123, thereby permitting an axial displaceability of the additional element relative to adjusting element 123, for example, for a precise adjustment of a rod element anchored to the fastening device.

In addition, tensioning device 122 may also be constituted of a tensioning bolt that is connected to rear-engagement member 112, and, at its end facing away from rear-engagement member 112, is provided with a blind hole for forming a mount for a rod element.

What is claimed is:

1. A fastening device for mounting on a mounting rail comprising:
   a rear-engagement member configured to be introduced into a mounting opening and to engage behind rims of the mounting opening of the mounting rail;
   a tensioning device cooperating with the rear-engagement member and having a longitudinal axis, for clamping the fastening device to the mounting rail;
   a contact plate for resting on an outside of the mounting rail, the contact plate having a feed-through opening for at least a part of the tensioning device;
   a spring element configured between the contact plate and the rear-engagement member for preloading the rear-engagement member circumferentially with respect to the longitudinal axis of the tensioning device;
   a holding device between the rear-engagement member and the contact plate for holding the rear-engagement member in the preloaded position; upon release of the holding device, the rear-engagement member being movable by the spring element from an insertion position to a rear-engagement position where the rear engagement member engages behind the rims of the mounting opening; and at least one stop element having a stop face for limiting a capacity of the rear-engagement member for twisting rotation by contact between the stop face and the rear engagement member in the rear-engagement position, the stop element being provided on the contact plate.

2. The fastening device as recited in claim 1 wherein the at least one stop element projects from the contact side of the contact plate facing the rear-engagement member.

3. The fastening device as recited in claim 1 wherein the holding device for the rear-engagement member is provided on the stop element.

4. The fastening device as recited in claim 3 wherein a guide contour for the rear-engagement member is provided between the holding device and a free end face of the stop element.

5. The fastening device as recited in claim 1 wherein a first cylindrical sleeve section is provided on a side of the rear-engagement member facing the contact plate, and a second cylindrical sleeve section surrounding the feed-through opening is provided on a contact side of the contact plate facing the rear-engagement member, the first sleeve section and the second sleeve section being configured to be mutually telescopic, and the at least one stop element being provided on the second sleeve section of the contact plate.

6. The fastening device as recited in claim 1 wherein the stop element includes at least one first latch for orienting the rear-engagement member in the insertion position and at least one second latch for orienting the rear-engagement member in the rear-engagement position, at least one counter-latch being provided on the rear-engagement member for engaging into at least one of the first and second latches in correspondence with the orientation of the rear-engagement member.

7. The fastening device as recited in claim 1 further comprising a second spring element between the end of a section of the tensioning device facing away from the rear-engagement member, and the contact plate, to spring-load a part of the tensioning device connected to the rear-engagement member, in the direction of the end facing away from the rear-engagement member.

8. The fastening device as recited in claim 1 wherein an end of a part of the tensioning device connected to the rear-engagement member and facing the same is provided with a securing device for the rear-engagement member.

9. The fastening device as recited in claim 1 wherein, at an end facing away from the rear-engagement member, the tensioning device has a mount for a rod element.

10. The fastening device as recited in claim 9 wherein, at the end facing away from the rear-engagement member, the tensioning device has a torque-receiving device for axially adjusting a rod element accommodated in the mount.

11. A fastening device for mounting on a mounting rail comprising:
a rear-engagement member configured to be introduced into a mounting opening and to engage behind rims of the mounting opening of the mounting rail;
a tensioning device cooperating with the rear-engagement member and having a longitudinal axis, for clamping the fastening device to the mounting rail;
a contact plate for resting on an outside of the mounting rail, the contact plate having a feed-through opening for at least a part of the tensioning device;
a spring element configured between the contact plate and the rear-engagement member for preloading the rear-engagement member circumferentially with respect to the longitudinal axis of the tensioning device;
a holding device between the rear-engagement member and the contact plate for holding the rear-engagement member in the preloaded position; upon release of the holding device, the rear-engagement member being movable by the spring element from an insertion position to a rear-engagement position where the rear engagement member engages behind the rims of the mounting opening; and
at least one stop element having a stop face for limiting a capacity of the rear-engagement member for twisting rotation, the stop element being provided on the contact plate;
wherein a first cylindrical sleeve section is provided on a side of the rear-engagement member facing the contact plate, and a second cylindrical sleeve section surrounding the feed-through opening is provided on a contact side of the contact plate facing the rear-engagement member, the first sleeve section and the second sleeve section being configured to be mutually telescopic, and the at least one stop element being provided on the second sleeve section of the contact plate.

12. A fastening device for mounting on a mounting rail comprising:
a rear-engagement member configured to be introduced into a mounting opening and to engage behind rims of the mounting opening of the mounting rail;
a tensioning device cooperating with the rear-engagement member and having a longitudinal axis, for clamping the fastening device to the mounting rail;
a contact plate having a mounting rail contact surface for resting on an outside of the mounting rail, the contact plate having a feed-through opening for at least a part of the tensioning device;
a spring element configured between the contact plate and the rear-engagement member for preloading the rear-engagement member circumferentially with respect to the longitudinal axis of the tensioning device;
a holding device between the rear-engagement member and the contact plate for holding the rear-engagement member in the preloaded position; upon release of the holding device, the rear-engagement member being movable by the spring element from an insertion position to a rear-engagement position where the rear engagement member engages behind the rims of the mounting opening; and
at least one stop element having a stop face for limiting a capacity of the rear-engagement member for twisting rotation by contact between the stop face and the rear engagement member in the rear engagement position.

13. The fastening device as recited in claim 12 wherein the at least one stop element projects from the contact side of the contact plate facing the rear-engagement member.

14. The fastening device as recited in claim 12 wherein the holding device for the rear-engagement member is provided on the stop element.

15. The fastening device as recited in claim 14 wherein a guide contour for the rear-engagement member is provided between the holding device and a free end face of the stop element.

16. The fastening device as recited in claim 12 wherein the stop element includes at least one first latch for orienting the rear-engagement member in the insertion position and at least one second latch for orienting the rear-engagement member in the rear-engagement position, at least one counter-latch being provided on the rear-engagement member for engaging into at least one of the first and second latches in correspondence with the orientation of the rear-engagement member.

17. The fastening device as recited in claim 12 further comprising a second spring element between the end of a section of the tensioning device facing away from the rear-engagement member, and the contact plate, to spring-load a part of the tensioning device connected to the rear-engagement member, in the direction of the end facing away from the rear-engagement member.

18. The fastening device as recited in claim 12 wherein an end of a part of the tensioning device connected to the rear-engagement member and facing the same is provided with a securing device for the rear-engagement member.

19. The fastening device as recited in claim 12 wherein, at an end facing away from the rear-engagement member, the tensioning device has a mount for a rod element.

20. The fastening device as recited in claim 19 wherein, at the end facing away from the rear-engagement member, the tensioning device has a torque-receiving device for axially adjusting a rod element accommodated in the mount.

* * * * *